Oct. 2, 1962    A. A. GRIFFITH    3,056,565
VERTICAL TAKE-OFF AIRCRAFT
Filed March 27, 1959    3 Sheets-Sheet 1
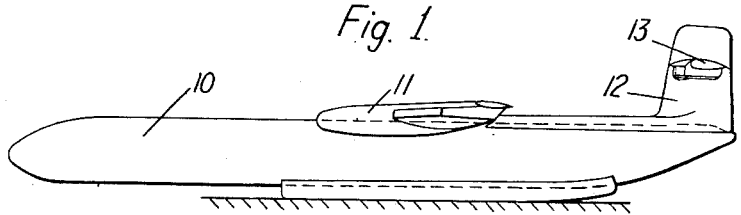
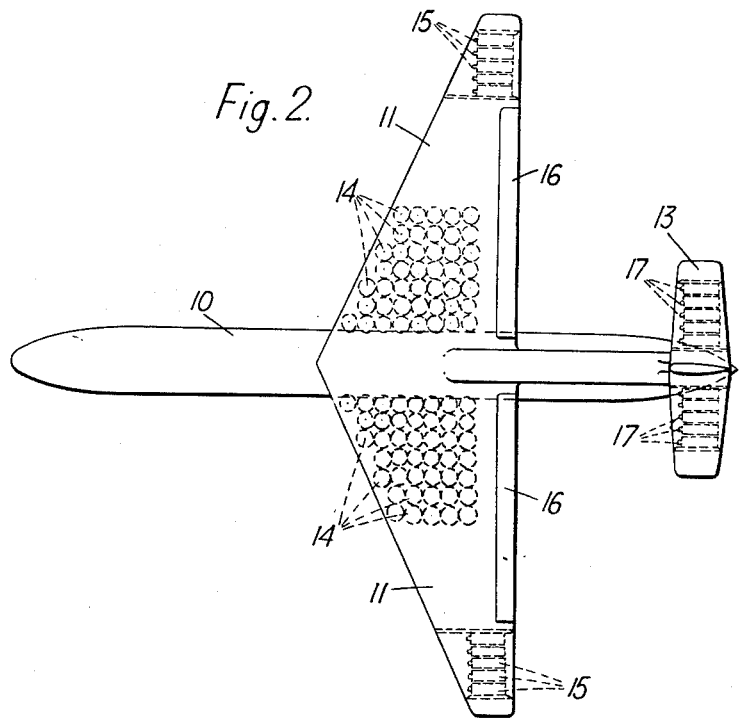
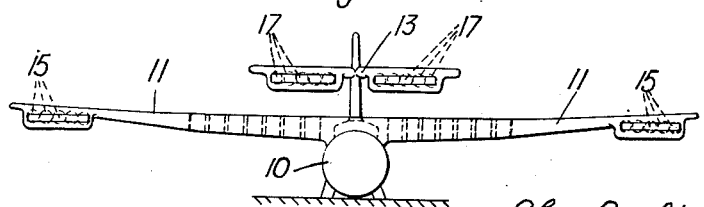
Alan Arnold Griffith
Inventor
By Leech & Radue
Attorneys Alan Arnold Griffith
Inventor

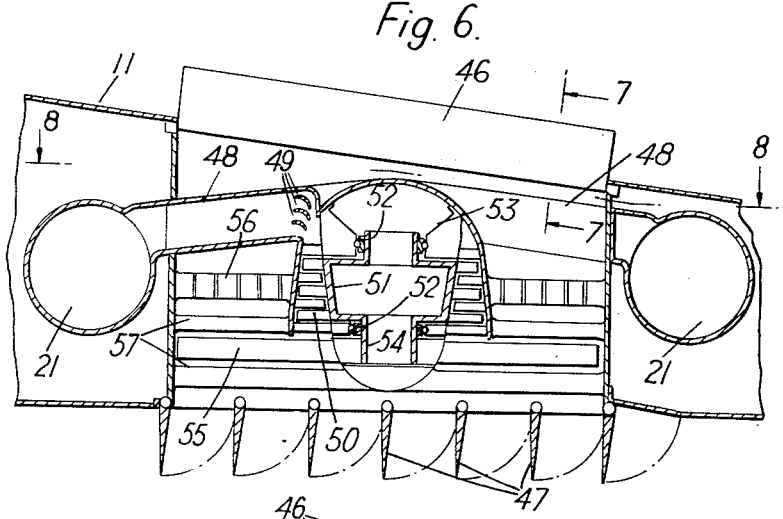
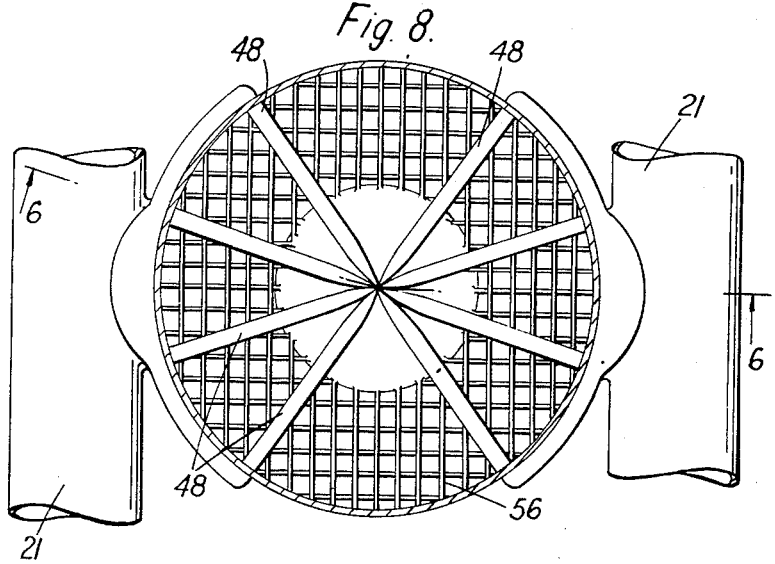

United States Patent Office 3,056,565
Patented Oct. 2, 1962

3,056,565
VERTICAL TAKE-OFF AIRCRAFT
Alan Arnold Griffith, Derby, England, assignor to Rolls-Royce Limited, Derby, England, a company of Great Britain
Filed Mar. 27, 1959, Ser. No. 802,563
Claims priority, application Great Britain Apr. 1, 1958
3 Claims. (Cl. 244—12)

This invention relates to a vertical take-off aircraft, that is to say an aircraft which has means for providing vertical lift other than the vertical lift provided by forward flight.

According to the invention, a vertical take-off aircraft is provided with a number of compressors arranged to produce vertical lift forces, each such vertical lift compressor incorporating a driving turbine and each such driving turbine being connected by a duct to a further compressor so that the driving turbine is driven by the air compressed by the further compressor, the further compressor being driven by a "free" turbine forming part of a gas turbine engine arranged for the forward propulsion of the aircraft.

The free turbine and said further compressor can be provided in addition to the normal compressor and turbine of a simple gas turbine engine used for forward propulsion and the air from the further compressor can, for example, be taken from the downstream end of the further compressor into a manifold formed around the compressor casing, the compressed air being ducted from this manifold to the driving turbines incorporated in the vertical lift compressors.

Preferably the further compressor is situated upstream of the main compressor of the gas turbine engine and air for the main compressor is taken through an annular intake passage surrounding the further compressor.

There can be a number of gas turbine engines each having the further compressor and free turbine and each being positioned to provide forward propulsion of the aircraft in addition to providing the compressor air for driving the vertical lift compressors.

If desired, air can be tapped off from the further compressors for feeding jet flaps for control of the aircraft. Alternatively, or additionally, the air can be tapped off from the further compressors for providing additional forward thrust, this air being passed through additional propulsion nozzles.

Preferably the arrangement is such that the pilot can exercise control over the proportion of air fed to the driving turbines of the vertical lift compressors, and to the jet flaps and additional propulsion nozzles.

If desired, the ducts which convey compressed air from the further compressors to the driving turbines of the vertical lift compressors can include combustion chambers for providing, when desired, heating of the compressed air during its passage to the driving turbines.

The jet flaps can be in the main wing of the aircraft or in the tail or both and the additional propulsion nozzles can also be located at the trailing edge of the main wing, tail plane, or both.

The vertical lift compressors can be axial flow compressors, centrifugal or radial flow compressors, or diagonal or mixed flow compressors. If desired the vertical lift compressors can be in the form conventionally known as "fans" although the movement of air produced by the "fans" is, in this instance, incidental to the main object of producing a vertical lift force.

The invention is illustrated, merely by way of example, in the accompanying drawings in which:

FIGURE 1 is a diagrammatic side elevation of a vertical take-off aircraft embodying the invention;

FIGURE 2 is a diagrammatic plan of the same aircraft;

FIGURE 3 is a diagrammatic front elevation of the same aircraft;

FIGURE 6 is a section through a fan-turbine arrangement taken on line 6—6 of FIGURE 8;

FIGURE 7 is a section on line 7—7 of FIGURE 6; and

FIGURE 8 is a section on line 8—8 of FIGURE 6.

Figure 4:
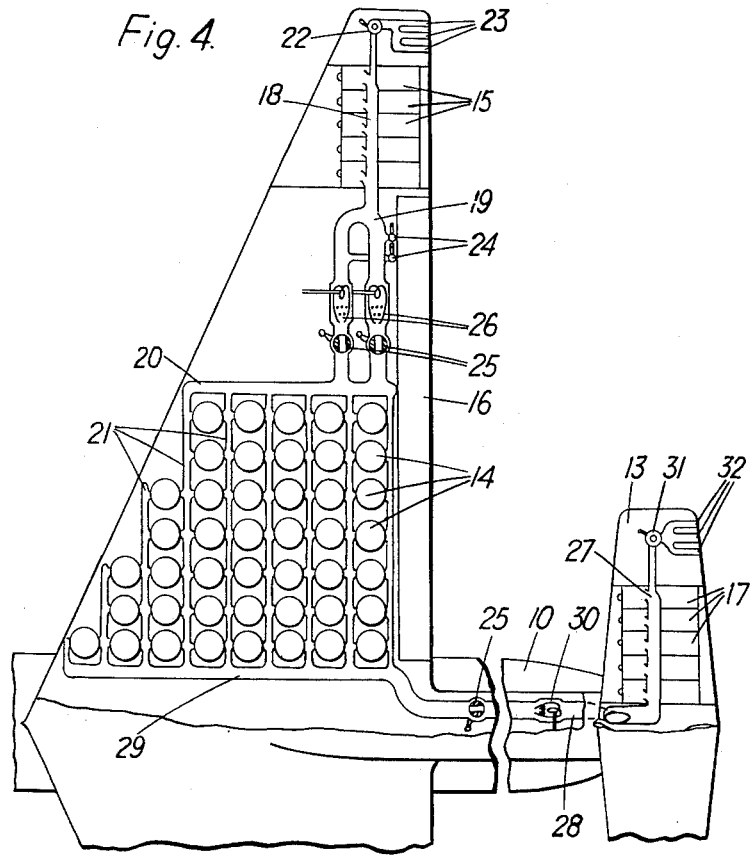
FIGURE 4 shows portions of the aircraft shown in FIGURES 1, 2 and 3 with parts broken away to show, diagrammatically, gas turbine engines and fans in the wing and tail plane.

The aircraft shown in FIGURE 1 has a fuselage 10 to which is attached a wing 11 and a tail structure 12, the tail structure 12 including a tail plane 13.

In the wing 11 are a large number of vertical lift compressors or fans 14, ten gas turbine engines 15 and controlling jet flaps 16 running the greater proportion of the span of the wing.

In the tail plane 13 are gas turbine engines 17 (FIGURES 2 and 3).

In FIGURE 4 the arrangement of the gas turbine engines 15, 17 and fans 14 is shown in more detail.

Each of the gas turbine engines 15 has an additional compressor which is tapped by means of a manifold 18, the additional compressed air being passed through ducting 19 to a manifold 20 from which the air is divided into a number of channels 21 feeding turbines associated with each of the vertical lift compressors, or fans, 14.

Air can also be taken from the manifold 18 through a control valve 22 to additional propulsion nozzles 23. The compressed air can be taken from the ducting 19 through control valves 24 to the jet flaps 16.

In the ducting 19 are a pair of combustion chambers 26 which can be used at will to heat the air in its passage from the additional compressors to the fan turbines.

Each of the gas turbine engines 17 in the tail plane 13 also has an additional compressor and the additional compressors are tapped by a manifold 27 to supply air to ducting 28 running along the aircraft fuselage 10. The ducting 28 leads to a manifold 29 which also supplies channels 21, these supplying the turbines of the lifting fans 14. The ducting 28 also has a combustion chamber 30 for heating the air in the ducting at will.

The manifold 27 is connected through a valve 31 to additional propulsion nozzles 32 so that some of the air produced by the additional compressors in the gas turbine engines 17 can be used to provide forward propulsion.

It will be appreciated that the gas turbine engines 15 and 17 are all positioned to provide forward propulsion of the aircraft in addition to providing air for driving the fans for producing vertical thrust.

The ducting 19 and the ducting 28 include control valves 25 which may be used in conjunction with valves 22, 31 and 24 for determining the proportions of air which flow to the fan turbines, the jet flaps, and the additional propulsion nozzles.

Figure 5:
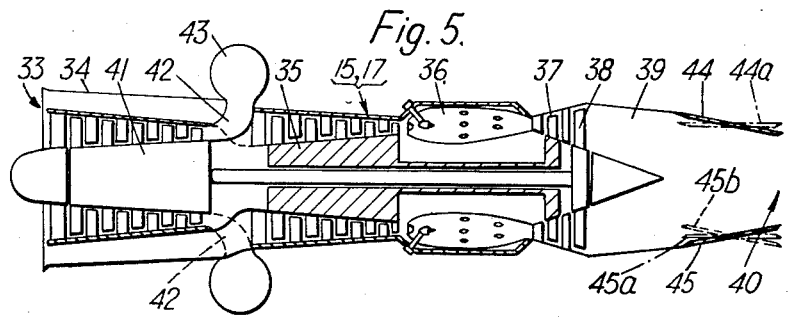
FIGURE 5 is a diagrammatic section through one of the gas turbine engines shown in FIGURE 4.

In FIGURE 5 is shown in detail one of the gas turbine engines 15 or 17. The engine has an air intake 33 leading to an annular by-pass duct 34 which surrounds an additional compressor 41 and which feeds the main compressor 35 of the engine. The compressed air is heated in combustion chambers 36 and passes through turbines 37 and 38 to an exhaust duct 39, terminating in a propulsion nozzle 40.

The turbine 37 drives the main compressor 35 and the turbine 38 is a free turbine which drives the additional compressor 41. The output of the additional compressor is taken through ducts 42 to a manifold 43 which feeds the manifolds 18, 27 shown in FIGURE 4.

The nozzle 40 comprises upper and lower pivotable portions 44 and 45. In the firm line position shown in FIGURE 5, the nozzle is in its minimum area position, in the chain dotted line position indicated at 44a, 45a the nozzle is in its maximum area position, and in the dotted line position 45b of the portion 45 the jet is deflected downwardly for additional lifting thrust and control.

One of the fans 14 and its associated turbine is shown in detail in FIGURE 6. The fan is housed in the wing 11 and its upper inlet can be opened and closed by means of pivoted flaps 46, shown in section in FIGURE 7.

Its outlet can be opened and closed by means of further pivoted flaps 47.

The channels 21 supply the compressed air through a number of radial ducts 48 (FIGURES 6 and 8) and through guide vanes 49 to the inlet of a turbine 50. The turbine rotor 51 is supported by bearings 52 from a fixed structure 53 and has an extension 54 carrying a fan blade 55, the fan blade 55 being disposed between inlet and outlet nozzle guide vanes 57. A lattice of vertical guide vanes 56 is provided to straighten the air as it is sucked downwardly by the fan blade 55.

In operation, air supplied through the radial ducts 48 passes through the turbine and drives the turbine rotor which in turn drives the fan blade 55. The fan blade 55 sucks air downwardly through the open flaps 46 and passes the air out through open flaps 47, thus providing lift.

Each fan blade 55 accelerates a large mass of air to a comparatively low efflux velocity. By restricting the efflux velocity of the air relative to the fan blade (e.g. to a value below Mach 0.8) the noise of take-off may be maintained at a permissible level.

During take-off, all of the air provided by the additional compressors would be employed to feed the fan turbines and the jet flaps could be provided with compressed air at will for control. If extra thrust is required, the combustion chambers 26 are lit.

During the transition, however, from vertical flight to forward flight, the chambers 26 and fan turbines are progressively taken out of operation. The forward speeds during the said transition are not allowed to exceed about one-third of the fan efflux velocity since there would otherwise be severe disturbances in the fan intakes.

In pure forward flight, when the main forward propulsion is provided by the gas turbine engines 15, 17, all the air from the additional compressors is expanded rearwards for propulsion through the additional nozzles 23, 32 and, if desired, jet flaps 16.

During cruising of the aircraft, the effective area of the propulsion nozzle 40 is reduced so as to increase the velocity of the gases therethrough. This causes the pressure drop across the free turbine to be diminished and hence the speed of the said free turbine and its associated additional compressor is also diminished, so that the velocity of the air issuing from the additional nozzles 23, 32 is also diminished. Hence by appropriate adjustment of the area of the propulsion nozzle 40 the speeds of the gas and air jets can be brought to approximate equality, as is required for optimum propulsive efficiency.

I claim:

1. A vertical take-off aircraft having in combination, a pair of wings, a power plant comprising vertical lift engines mounted in vertical tubes clustered in and extending through each wing and a forward propulsion engine secured on the aircraft and equipped to produce vertical lift forces and forward propulsive forces respectively; each of said vertical lift engines comprising a driving turbine; said forward propulsion engine comprising combustion equipment, a main turbine driven by the products of combustion produced in the combustion equipment, and a main compressor driven by the main turbine and connected to supply compressed air to the combustion equipment; an exhaust conduit mounted on the aircraft to receive the exhaust gases from the main turbine and direct them rearwardly so as to produce a forward propulsive thrust; a second turbine mechanically separate from the main turbine and mounted in the exhaust conduit in the path of said exhaust gases so as to be driven thereby; a second compressor driven by said second turbine and disposed upstream of the main compressor: a first annular casing concentrically surrounding the said second compressor, said first casing forming the outer wall of an air intake passageway for said second compressor which passageway opens forwardly in direct communication with ambient air, a second annular casing concentrically surrounding said second compressor and said first annular casing, said first and second annular casings defining therebetween a main compressor air intake passageway which opens forwardly in direct communication with ambient air; and duct means connecting the second compressor to the driving turbines of each of said vertical lift engines so that the latter are driven by the air compressed by the second compressor.

2. A vertical take-off aircraft having in combination, a pair of wings, a power plant comprising vertical lift engines mounted vertically in clusters and extending through each wing and forward propulsion engines mounted on the aircraft and equipped to produce vertical lift forces and forward propulsive forces respectively; said vertical lift engines each comprising a driving turbine; said forward propulsion engines each comprising combustion equipment, a main turbine driven by the products of combustion produced in the combustion equipment, and a main compressor driven by the main turbine and connected to supply compressed air to the combustion equipment; an exhaust conduit for and mounted on the aircraft to receive the exhaust gases from each main turbine and direct them rearwardly so as to produce forward propulsive thrusts; a second turbine for each propulsion engine mechanically separate from the main turbine thereon and mounted in the path of said exhaust gases therefrom so as to be driven thereby; a second compressor driven by each second turbine; a duct connecting the second compressors to the driving turbines of the vertical lift engines so that the latter are driven by the air compressed by the second compressors; a forward propulsion nozzle; means for supplying compressed air from the second compressors to the forward propulsion nozzle; a jet flap mounted on the aircraft for the control thereof; means for supplying compressed air from the second compressors to the jet flap; and means for controlling the proportion of air supplied from the second compressors to the driving turbines, jet flap, and forward propulsion nozzle.

3. A vertical take-off aircraft as claimed in claim 1, including a jet flap mounted on the aircraft for the control thereof, and means for delivering compressed air from the second compressor to said jet flap.

References Cited in the file of this patent

UNITED STATES PATENTS

| | | |
|---|---|---|
| 2,501,078 | Newcomb | Mar. 21, 1950 |
| 2,514,408 | Mierley | July 11, 1950 |
| 2,650,666 | Dorand et al. | Sept. 1, 1953 |
| 2,843,340 | Wibault | July 15, 1958 |
| 2,844,337 | MacArthur | July 22, 1958 |
| 2,884,633 | Stahmer | Apr. 28, 1959 |
| 2,899,149 | Breguet | Aug. 11, 1959 |
| 2,912,188 | Singlemann | Nov. 10, 1959 |
| 2,986,359 | Tino | May 30, 1961 |
| 2,990,138 | Shaw | June 27, 1961 |